United States Patent Office 3,507,950
Patented Apr. 21, 1970

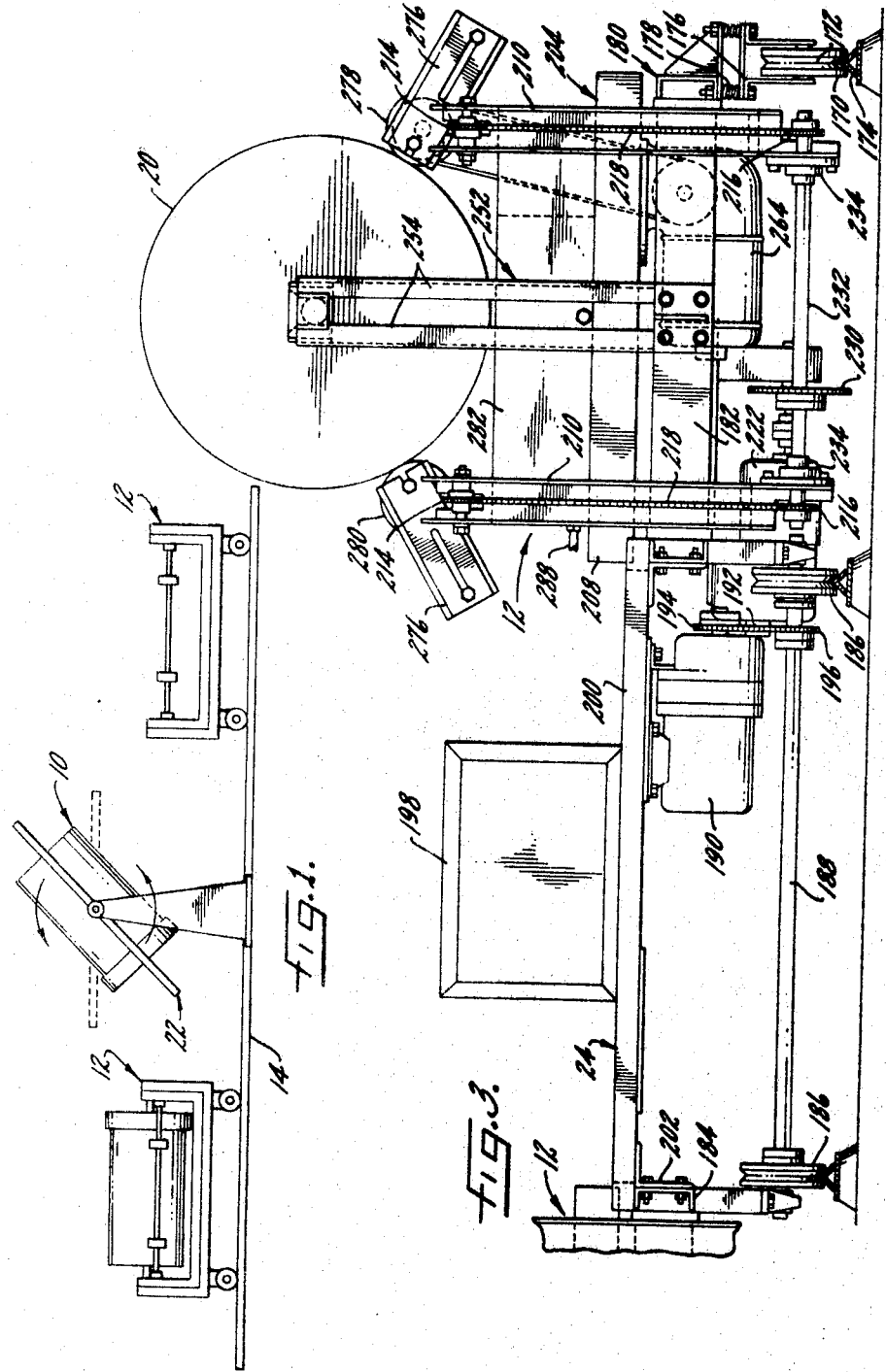

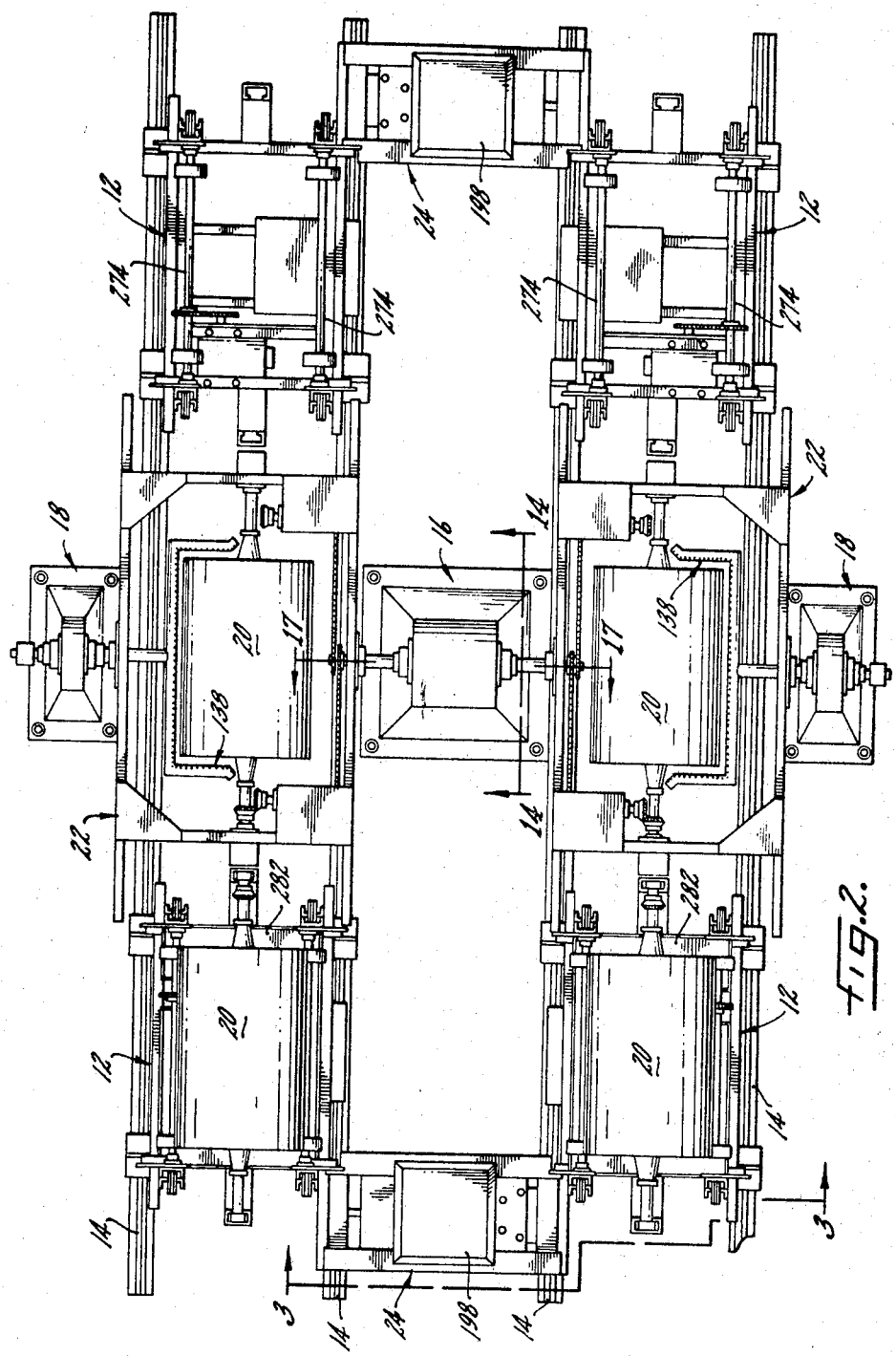

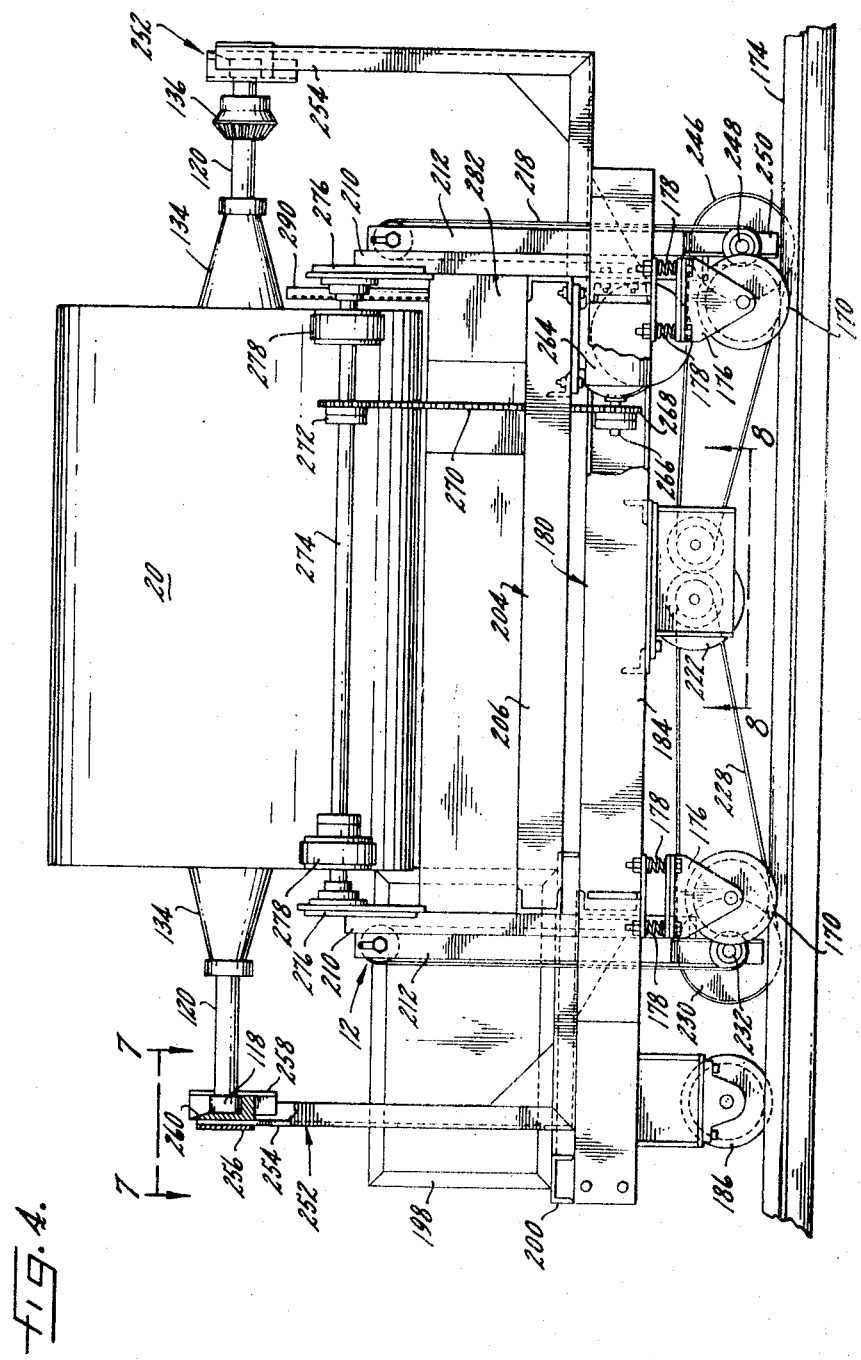

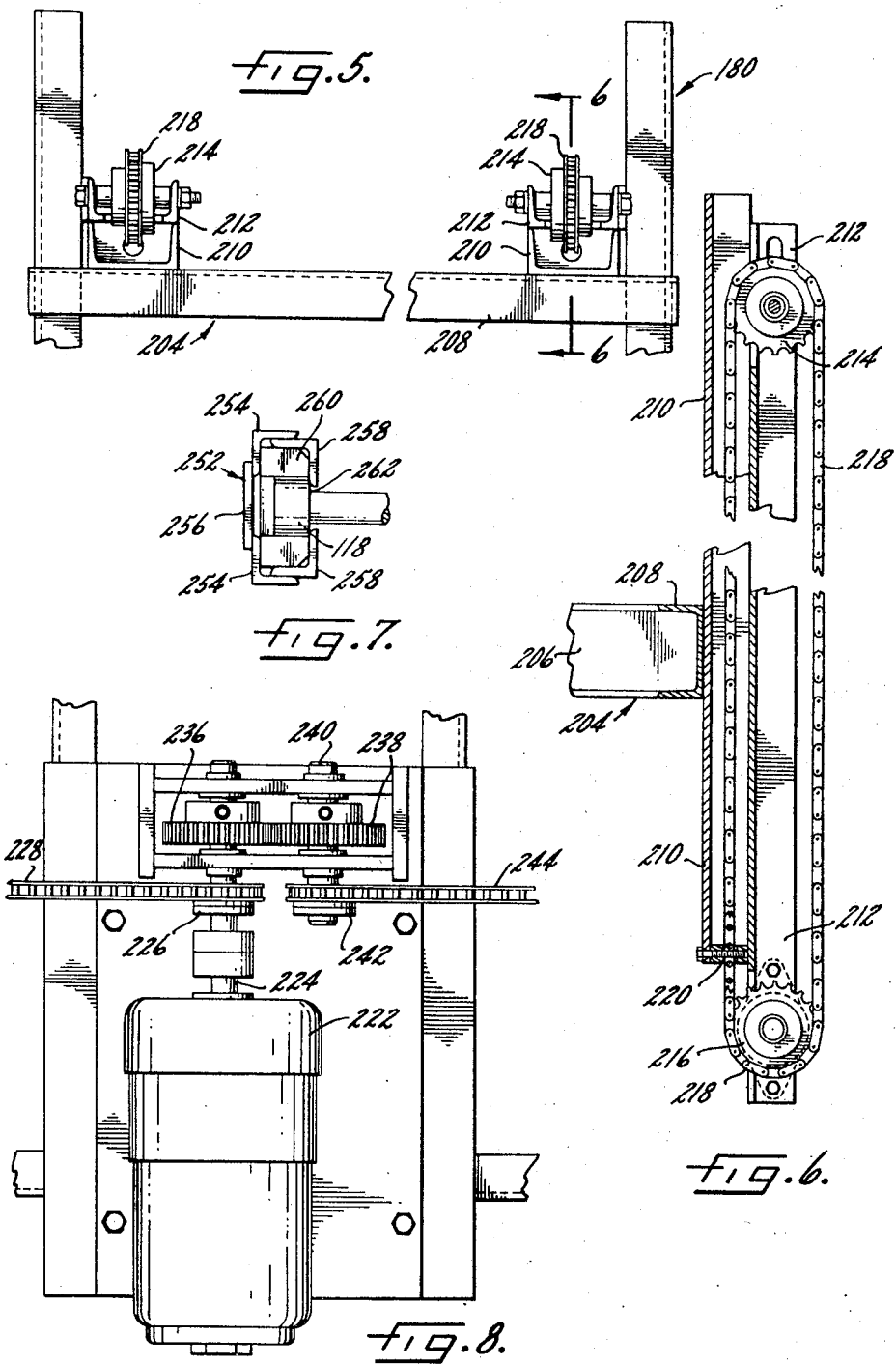

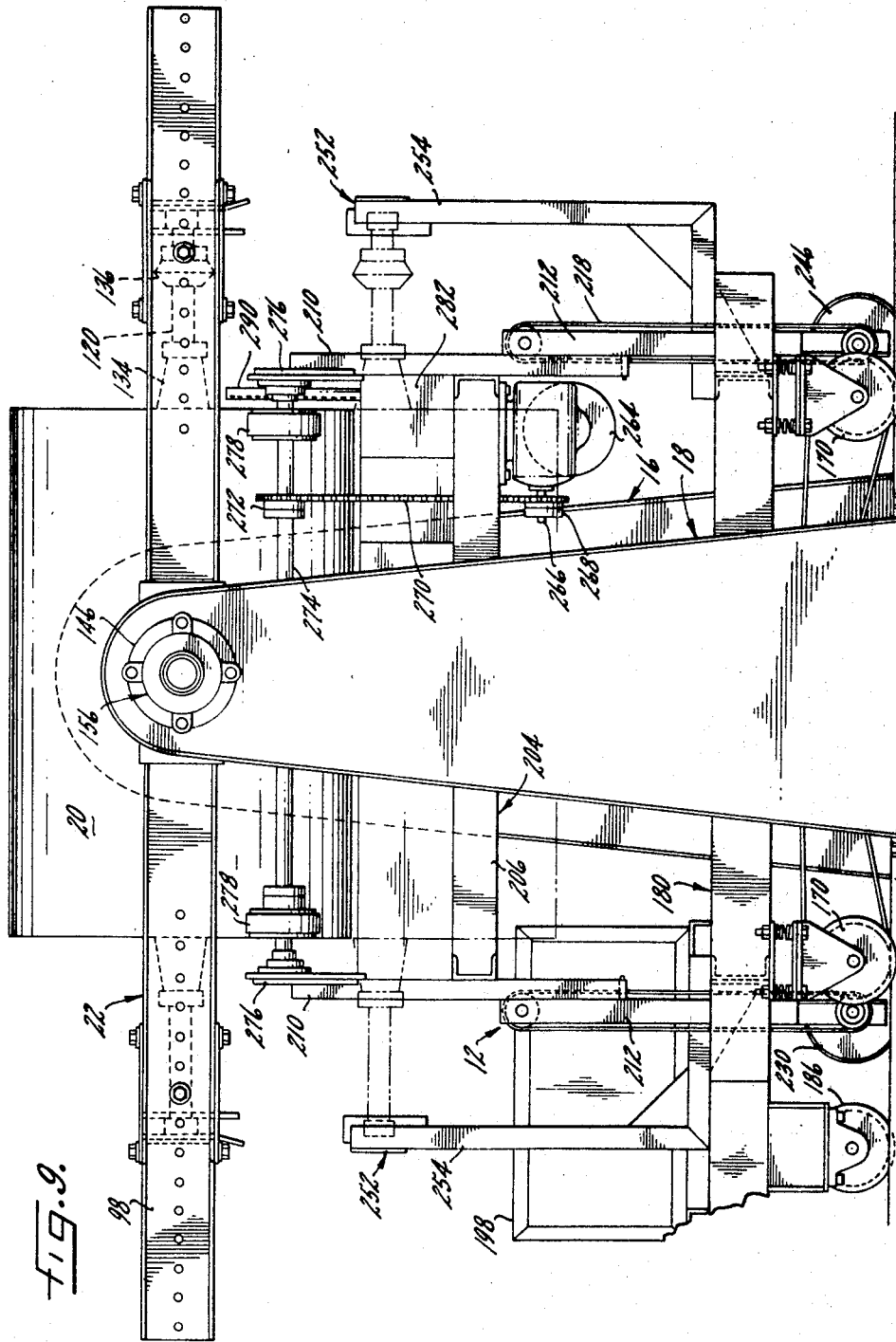

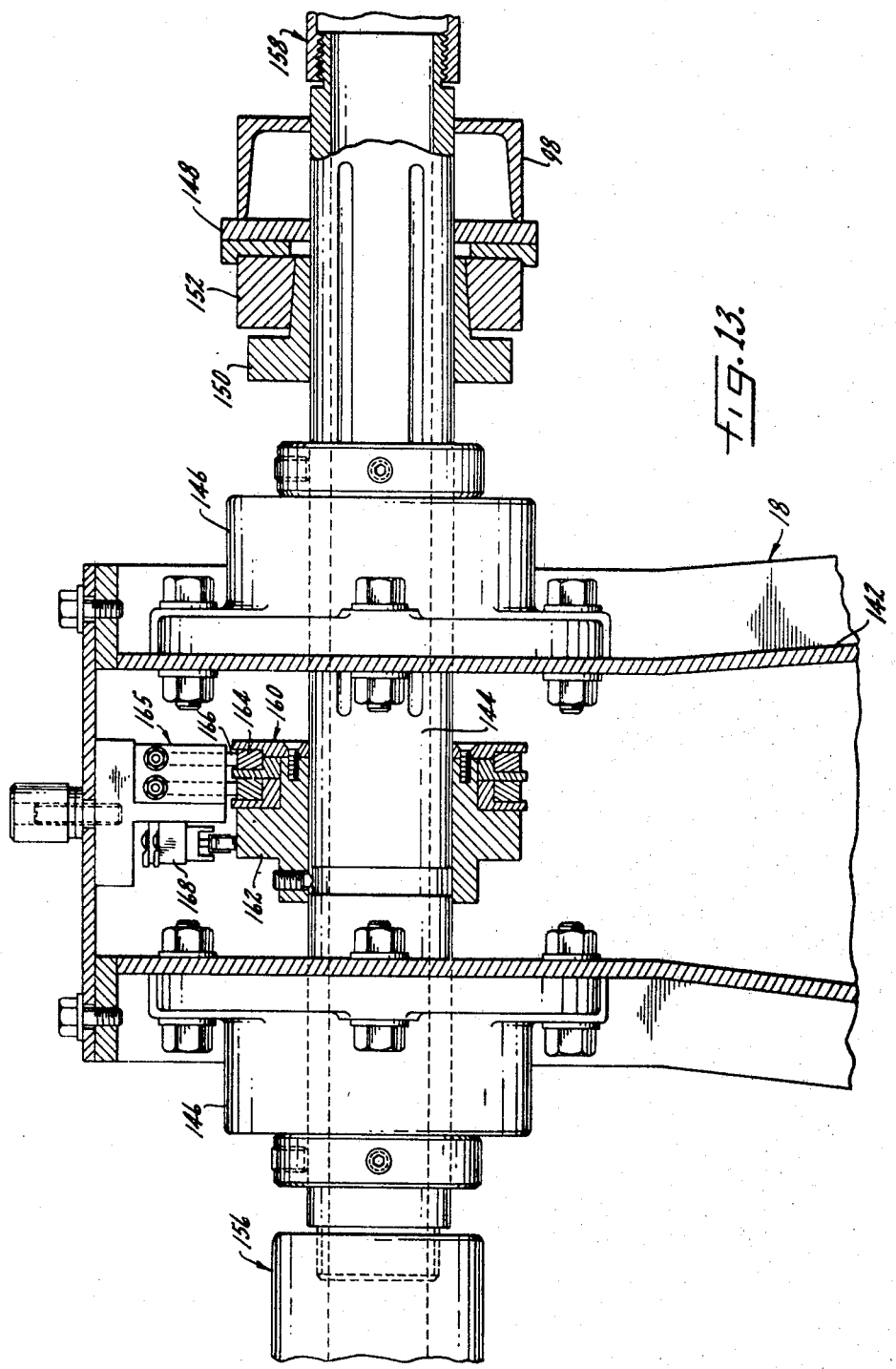

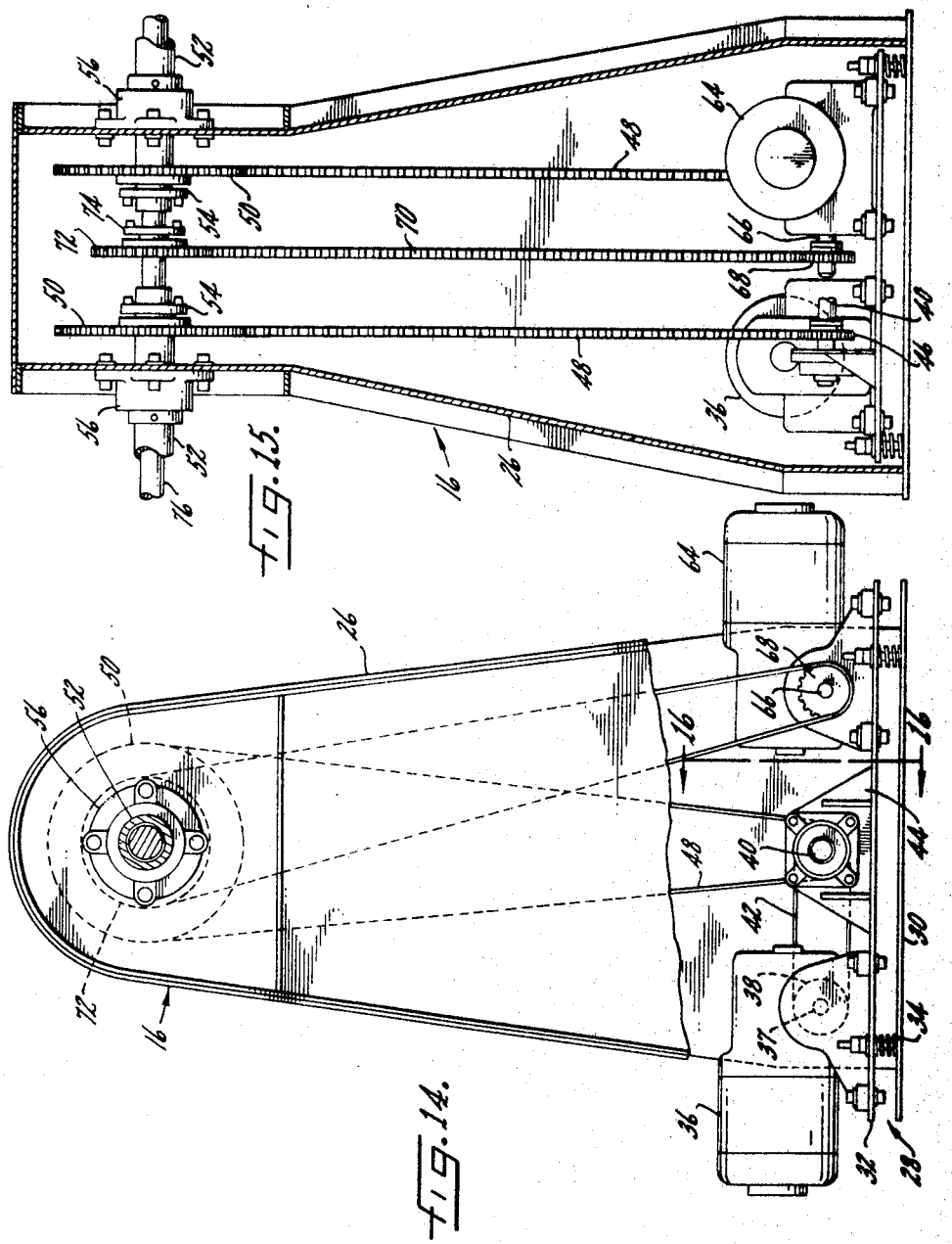

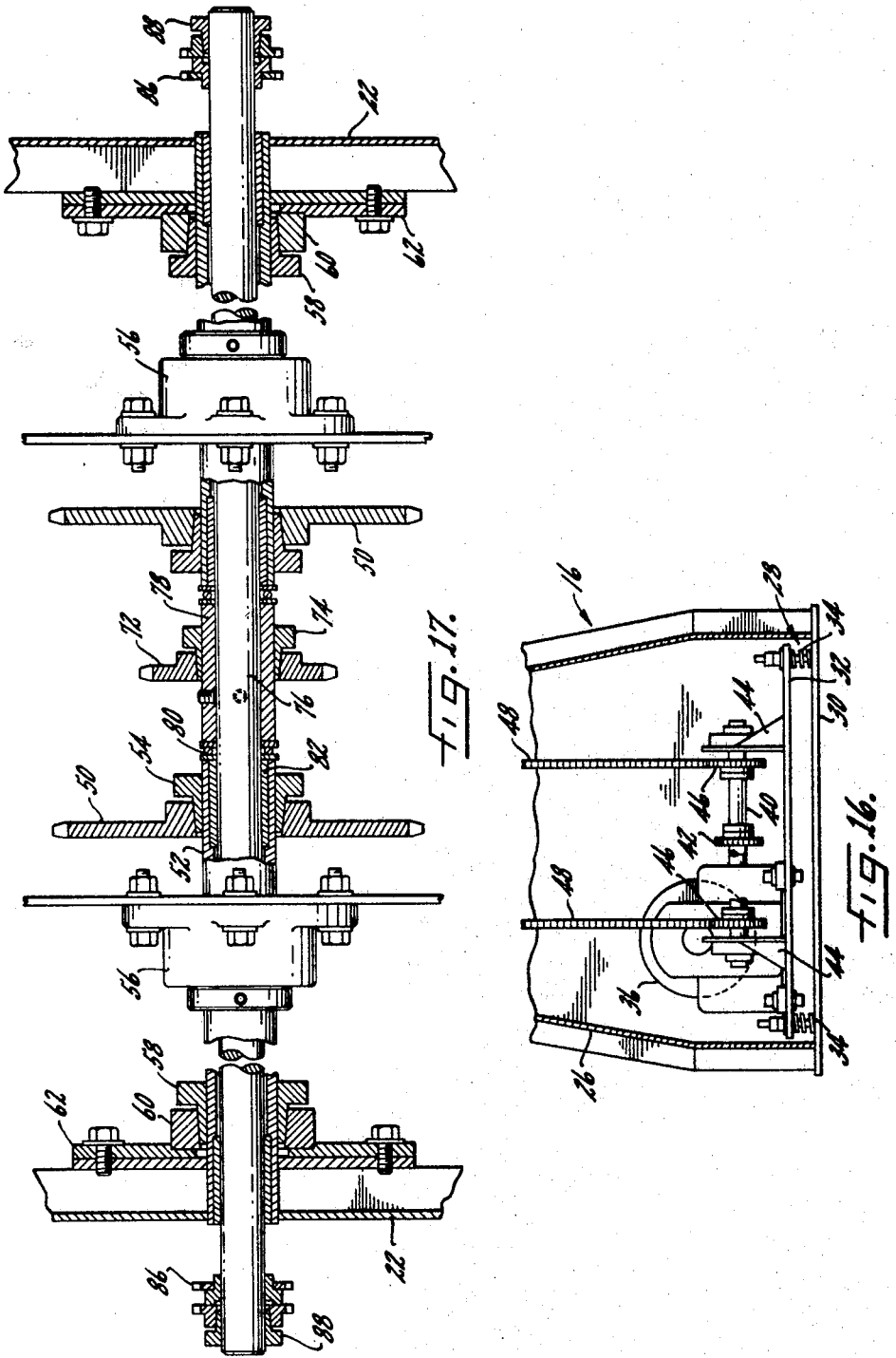

3,507,950
METHOD OF THERMOFUSION MOLDING
Louis H. Barnett and Henry P. Horton, Fort Worth, Tex., assignors to Vistron Corporation, Cleveland, Ohio, a corporation of Ohio
Continuation-in-part of application Ser. No. 307,587, Sept. 9, 1963. This application Apr. 24, 1967, Ser. No. 633,141
Int. Cl. B29c 5/04; B28b 1/54
U.S. Cl. 264—310                                    1 Claim

ABSTRACT OF THE DISCLOSURE

This invention relates to a method and apparatus for thermofusion molding of plastic resin materials in a mold which is rotatable in compound motion so as to form a layer of plastic material within the mould while being heated predominantly with infra-red radiation by a heat source embracing at least a part of said mold.

CROSS REFERENCE TO RELATED APPLICATIONS

Figure 10:
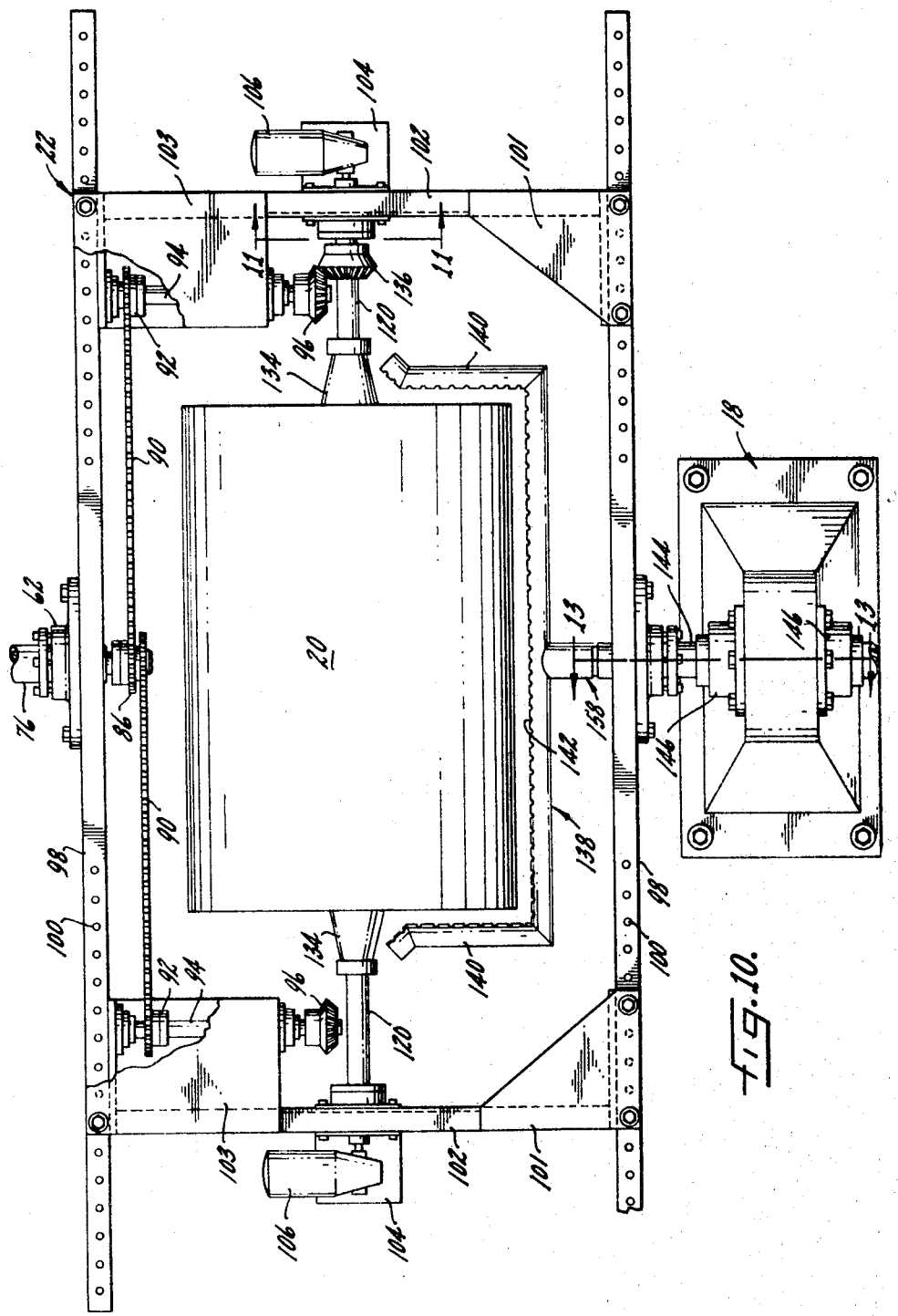

The instant application is a continuation-in-part application of copending application Ser. No. 307,587, filed Sept. 9, 1963, now U.S. Patent No. 3,315,314.

BACKGROUND OF THE INVENTION

A number of processes and apparatus are known which utilize heat to form articles in a mold, after which the hot mold is cooled and the article removed. The molding apparatus utilized in these processes are designed to provide compound mold motion, that is, the mold is rotatable multiaxially; a preferred compound motion is described as one in which the mold is continuously rotating about a first axis and simultaneously rotating about a second axis perpendicular to said first axis. Apparatus of this type have been most popular in the manufacture of articles from various plastisols which are thermosetting and for articles from certain thermoplastic resins, particularly polyethylene, which is introduced into a mold as a finely divided particulate material which is fused into a layer conforming to the interior surface of the mold upon the application of heat.

Heat is applied to the mold in a variety of ways. For example most processes comprise using a heat transfer fluid in a jacket which is in thermal communication with the interior of the mold. For example, U.S. Patent No. 3,117,346 and 3,095,260 disclose the use of heat-exchange fluids; British Patent No. 1,045,152 discloses the use of hot oil as does copending application Ser. No. 326,561.

Still another process for rotationally molding plastic articles uses gas flames to heat the mold as disclosed in U.S. Patent No. 3,301,925. Though this method of heating the mold is extremely effective in that it provides a very large quantity of heat at a very high temperature at the outer skin of the mold, the disadvantage is that the heat input is difficult to control, which results, too often, in charring of the plastic material, a problem which was never successfully overcome. The process of the instant invention does so.

SUMMARY

The discovery that high-intensity, predominantly infra-red radiant energy such as that obtained on a gas-fired ceramic grid, provides an easily controllable highly uniform and very economical heat source in the method of multiaxial rotational molding of heat-formable plastic resins, is the basis of the instant invention.

An object of the instant invention is to provide a thermofusion molding process in which the mold, or a plurality of molds in a frame, rotate simultaneously about multiaxially perpendicular axes while the mold is being heated by predominantly infra-red radiant energy emanating from a heat source fixedly disposed relative to said frame.

Another purpose is to provide a rotational molding machine including means for efficiently moving the molds into and out of the mold rotating apparatus.

Another purpose is to provide a rotational molding system of the type described including means for continuously applying heat to a rotating mold.

Another purpose is to provide a rotational molding system including a group of vehicles for moving the molds into and out of the mold rotating apparatus, with each of the vehicles including means for cooling the molds after removal from the mold rotating apparatus.

Another purpose is to provide a rotational molding system of the type described including a number of self-propelled vehicles or dollies, with each of the dollies mounting rollers for rotating a mold, and an elevator for raising and lowering a mold.

Another purpose is to provide a rotational molding system including means for automatically stopping the mold rotating apparatus in position to automatically remove the mold.

Another purpose is to provide a mold rotating apparatus which will take large molds.

Another purpose is to provide an improved drive system for a rotational molding system of the type described.

Other purposes will appear in the ensuing specification, drawings and claim.

Figure 11:
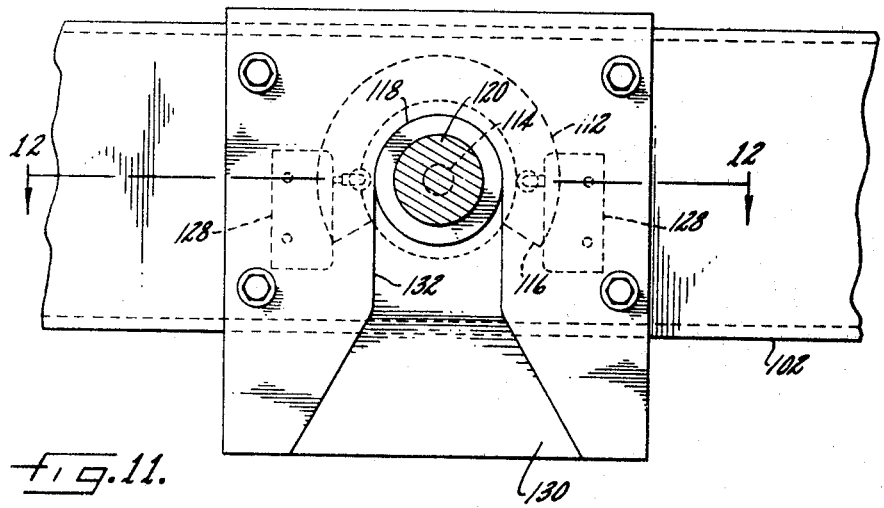
Figure 12:
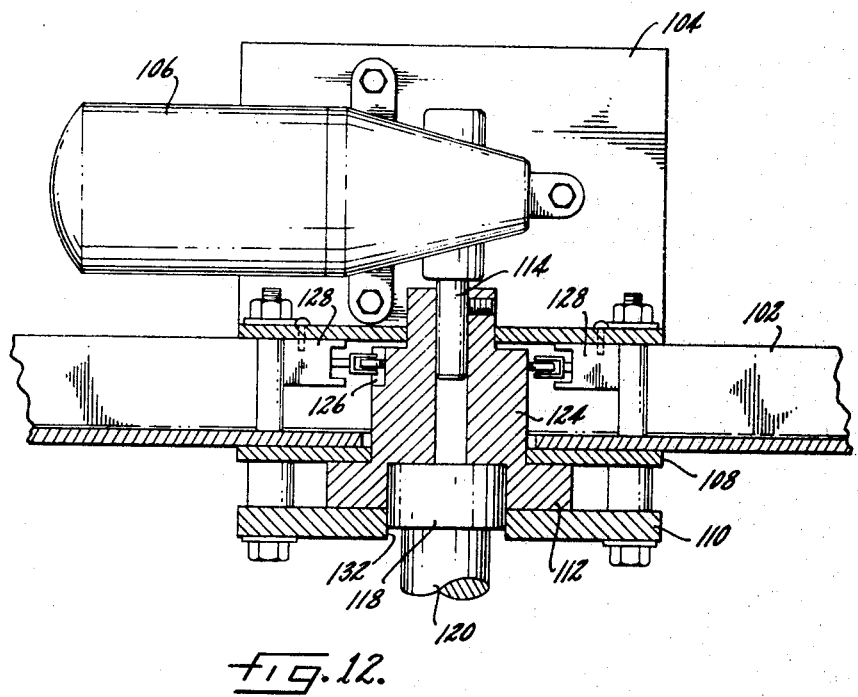
Figure 19:
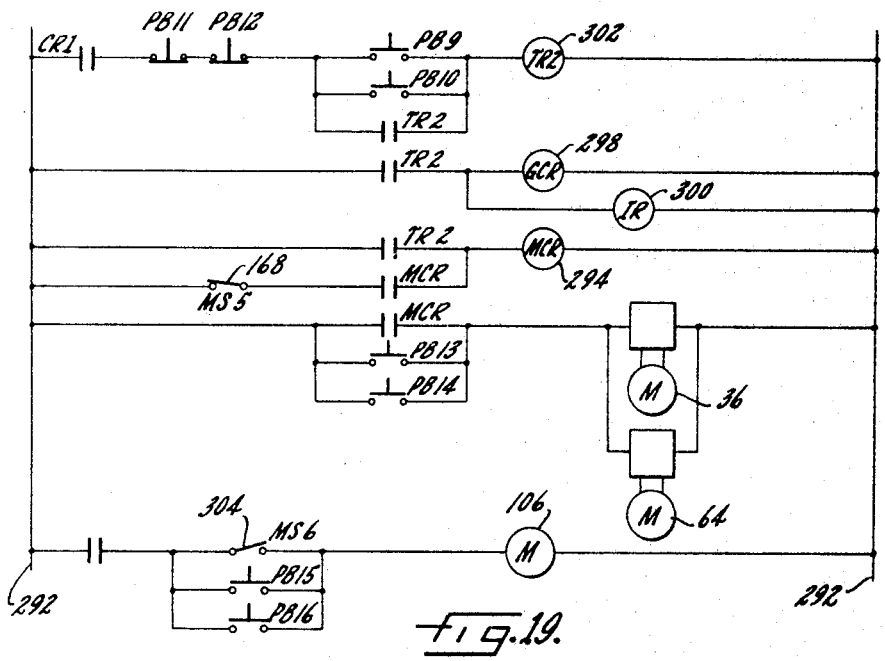
Figure 18:
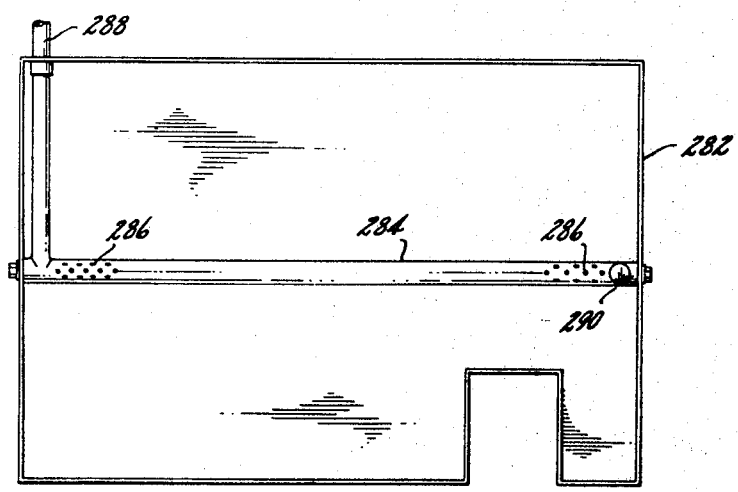
Figure 20:
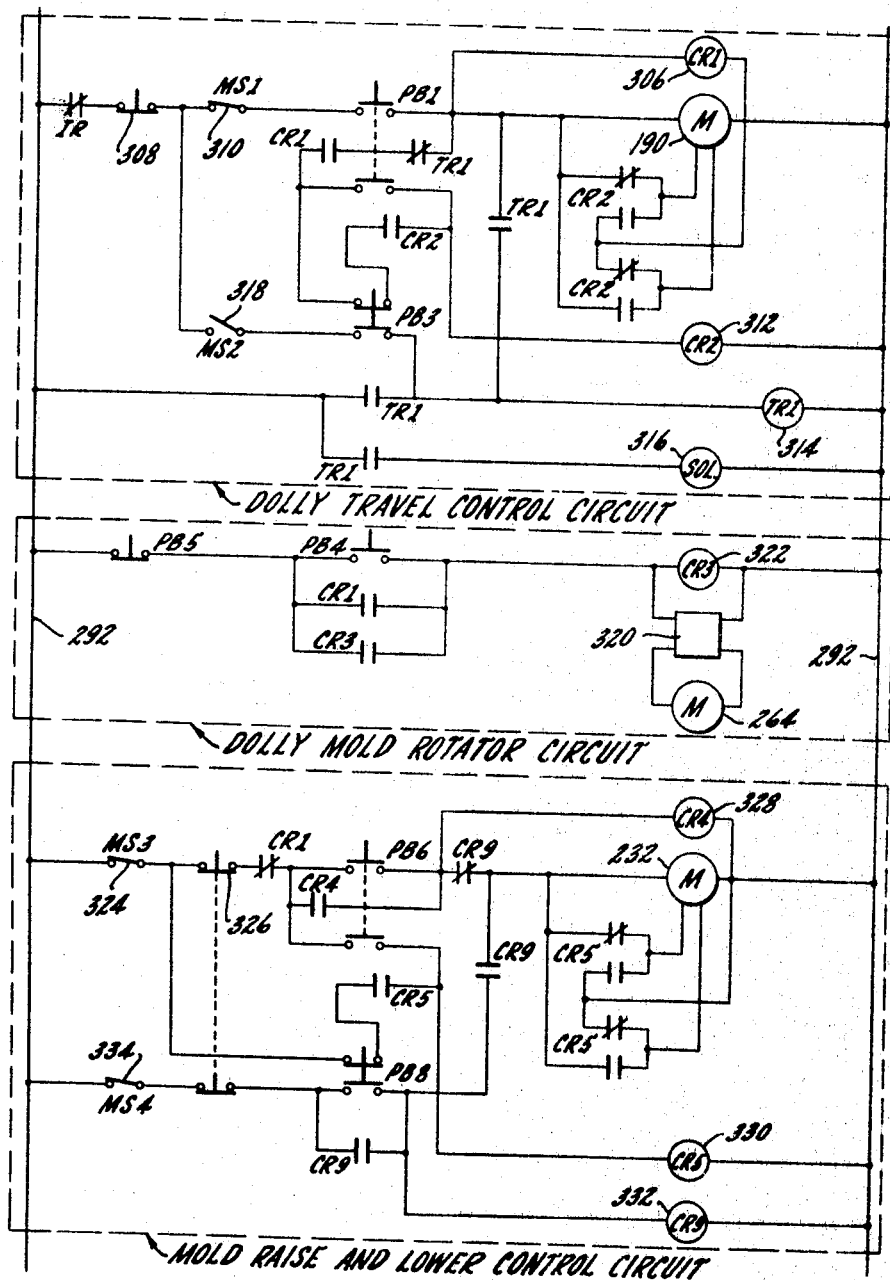

The invention is illustrated diagrammatically in the following drawings wherein:

FIGURE 1 is a diagrammatic illustration of a rotational molding system of the type described, FIGURE 2 is a detailed top plan view of the rotational molding system of FIGURE 1, on an enlarged scale, FIGURE 3 is an enlarged end view taken along plane 3—3 of FIGURE 2, FIGURE 4 is an enlarged side view of one of the dollies illustrated in FIGURE 2, FIGURE 5 is a top plan view illustrating the elevator arrangement on each dolly, FIGURE 6 is a section along plane 6—6 of FIGURE 5, FIGURE 7 is a top plan view along plane 7—7 of FIGURE 4, FIGURE 8 is a view along plane 8—8 of FIGURE 4, FIGURE 9 is a side elevation of the system illustrated in FIGURE 2, on an enlarged scale, and showing a mold in both a raised and a lowered position, FIGURE 10 is a top plan view, on an enlarged scale, illustrating a part of the system shown in FIGURE 2, FIGURE 11 is a section along plane 11—11 of FIGURE 10, FIGURE 12 is a section along plane 12—12 of FIGURE 11, FIGURE 13 is a section along plane 13—13 of FIGURE 10, FIGURE 14 is a section along plane 14—14 of FIGURE 2, FIGURE 15 is an end view of the center support illustrating the mold drive, FIGURE 16 is a section along plane 16—16 of FIGURE 14, FIGURE 17 is a section along plane 17—17 of FIGURE 2, FIGURE 18 is an enlarged top view illustrating the mold cooling arrangement, FIGURE 19 is an electrical schematic diagram illustrating a part of the system controls, and FIGURE 20 is an electrical schematic diagram illustrating another part of the system's controls.

Turning to FIGURE 1, a mold rotating apparatus is indicated generally at 10 and is positioned between vehicles or dollies illustrated generally at 12. The dollies 12 are movable on tracks 14 toward and away from the mold rotating apparatus 10. In practice, one of the dollies 12 will move a mold beneath the mold rotating apparatus 10. The mold will be raised and properly positioned in the mold rotating apparatus and the dolly will then draw back. During the period that the mold is being rotated, the mold on the other dolly will be cooled and then the molded part will be stripped from it. A new charge will be deposited in the mold so that as soon as the molding cycle is completed, a new mold will be ready. In this way, it is possible to make maximum use of the mold rotating apparatus. The dollies or vehicles move in and out toward the mold rotating apparatus and each of the dollies carries a cooling system. In addition, each of the dollies carries a means for rotating the mold as it is cooled.

Turning now to FIGURE 2, the mold rotating apparatus may include a center support 16 and end supports 18. Each of the molds 20 is positioned in frames illustrated generally at 22, with the frames being rotatably mounted on the supports 16 and 18. The ends of the molds 20 are supported for rotation in the frames 22 in a manner to be described and, at the same time as the frames are rotating, the molds are rotating about an axis generally perpendicular to the axis of rotation of the frames. As shown in FIGURE 2, each of the dollies 12 on one side of the mold rotating apparatus are tied together by a bridge illustrated generally at 24 so that the pair of dollies on each side simultaneously move toward and away from the mold rotating apparatus. This is not necessary and it may be desirable to move the dollies separately.

Turning now to FIGURES 14–17, the central support 16 may include an outer housing 26 mounted upon a base indicated generally at 28 and including an upper plate 32 yieldingly mounted by springs or the like 34 to a base or lower plate 30. Mounted on plate 32 is a first drive motor 36 having a drive shaft 37. Drive shaft 37 mounts a gear 38 or the like which drives a shaft 40 through a suitable flexible drive member 42, for example a chain or the like. Shaft 40, mounted in supports 44, may have a pair of spaced gears 46 around which pass flexible drive members 48. The chains may run up to the top of the center support 26 to drive gears 50 which are fixed on hollow sleeves or spindles 52 by means of mounting collars 54 or the like. The sleeves 52 extend through the side walls of the housing 26, through bearing supports 56, and are connected by mounting collars or the like 58 to the rotatabel frames indicated generally at 22. Locking collars 60 and mounting plate 62, suitably bolted to the frame 22, complete the connection of sleeves 52 to the frame 22. The drive motor 36 is effective to rotate both of the frames 22 through the mechanism described above.

Also mounted within the center support 26 is a second drive motor 64 having a drive shaft 66 mounting a gear 68 or the like. A suitable flexible drive member, for example, a chain, is illustrated at 70 and passes around gear 68 and a gear 72 positioned at the top of the center support housing 26. Gear 72 is fixed by a mounting collar 74 to a central shaft or common shaft 76 through a sleeve 78. Bearings 80 are positioned between sleeve 78 and sleeves 52, and bearings 82 may be positioned between shaft 76 and sleeves 52. Shaft 76, which is rotated by gear 72, extends through sleeves 52, with outboard bearings 84 being positioned between shaft 76 and the ends of sleeves 52. Each outside end of shaft 76 may mount a pair of gears 86 which are fixed to the shaft 76 by means of mounting collars or the like 88.

When the dollies are moved independently, the frames may be rotated independently, either through separate drive systems or through a suitable clutch arrangement. In like manner, the frame rotating drive system described below can provide for independent drive.

FIGURE 10 illustrates the details of the mold drive. Chains or the like 90 may extend in opposite directions from gears 86. Each of the chain 90 passes around a gear 92 fixed to a drive shaft 94. Each of the drive shafts 94 may mount a bevel gear 96 at their inside ends, the bevel gears each being in position to drive a mold mounted in frame 22. Bevel gears are provided at each end of the frame although normally the mold will only be driven from one end. A friction drive may replace the bevel drive with equally satisfactory results.

Each frame 22 may include side frame members 98, each of which has a plurality of generally equally spaced holes 100, and end frame members 102. The space between the end frame members 102 may be adjusted by means of the spaced holes 100 so that the frame can accommodate various size molds. Corner plates 101 and 103 may be fastened to the members 98 and 102, with plates 103 overlying drive shafts 94. Other means of adjustment, for example ways with lock screws, may be equally satisfactory.

Each of the end frame members 102 mounts plates 104, as illustrated in FIGURES 11 and 12, with the plates mounting small gear motors or the like 106. Plates 108 and 110 are each suitably bolted to the end frame members 102 and are spaced apart a distance sufficient to accommodate a portion of a locking member 112 driven by shaft 114 of the gear motor 106. The locking members 112 each have a somewhat crescent-shaped or U-shaped locking portion 116 which holds an end 118 of the stem or spindle 120 positioned on each end of a mold 20. The locking members 112 also have a generally central cylindrical portion 124 which has a cam surface 126 positioned for contact by cam-operated switches or microswitches 128. Rotation of the locking members 112 by the gear motors 106 will lock and unlock a mold in position on the frame. The switches 128 are positioned to start and stop the gear motor at the locked and unlocked positions. The mold will be rotating uniaxially in the dolly and will continue rotation while being elevated into position in the stationary frame 22; when locked into the frame, bevel gears 96 and 136 will be meshed and rotation of the mold is continued by the drive motors. On completion of the heating cycle the frame 22 is indexed in the horizontal position and the rotating mold is lowered into the dolly wherein rotation is continued. Plate 108, as shown in FIGURE 11, has a somewhat wedge-shaped opening 130 which will accept the ends 118 of the mold spindles. The ends are passed through the generally central open areas 132 of the locking portions 116 after which the locking members are rotated to hold the mold in position to the frame. Other types of locking mechanisms may be practical and the invention should not be limited to the structure shown. Lock wedges, wedge blocks, magnets, etc., may all be satisfactory.

The mold 20 may take any one of a number of different shapes and the invention should not be limited to any particular type or size of mold. As shown herein, the mold is generally cylindrical, although it could be otherwise, for example, square, rectangular, oval or irregularly shaped. The mold which may be in two or more pieces, may have a spindle 120 mounted on each of its ends with generally conical portions 134 directly attaching the spindles 120 to the mold. One of the spindles carries a bevel gear 136 which is in mesh with one of the bevel gears 96 to rotate the mold about an axis generally perpendicular to the axis of rotation of the frame 22. In some applications a series of smaller molds may be attached together and all mounted in one frame or in multiple frames.

Various predominantly infrared heating elements may be provided to heat the mold as it rotates. As shown herein, there is a single gas-fired, predominantly infrared radiant energy source in the temperature range of from about 1200° F. to 3000° F., indicated generally at 138 which extends along the longitudinal side of the mold and has end portions 140 which extend radially toward the center of the mold. Any number of these heating units may be utilized. There may be one on opposite sides of the mold, or there may be one in every quadrant. In addition the invention includes the provision of a heating element extending completely around the mold and fixed to or rotating with the mold. The heating element 138 may have a plurality of small openings or the like 142 through which jets of flame may be directed toward the mold as it rotates.

The outside or outboard supports 18, illustrated in FIGURE 13, each include a housing indicated generally at 142, with the upper end of each housing mounting a shaft 144. The shaft 144 extends inwardly, through bearing supports 146, held to the housing 142 by bolts or the like, and through the side frame members 98. Cover plates or the like 148 are fixed to the shaft 144 by locking collars 150 and locking members 152. As the frame rotates it rotates the shaft 144 in the bearing supports 146. The shaft 144 is hollow and gas may pass therethrough from an outside source indicated generally at 156, through the gas connection indicated generally at 158 at the inside end of the shaft 144, to the heater 138. The outside supports may have a slip ring or commutator assembly indicated generally at 160 and including a slip ring support 162 fixed to the shaft 144 and slip rings 164 mounted in the slip ring support. A brush assembly is indicated generally at 165 and includes brushes 166 in contact with the slip rings 164. A cam-operated switch 168 is used to properly position the frames at the end of a molding cycle. The brush and slip ring assembly is provided to carry the electrical control signals from the rotating frame to the electrical control panel, as described hereinafter, and may also be used to carry the power for electric heating which may be used in place of gas.

Turning to FIGURES 3 and 4, each of the vehicles or dollies 12 includes wheels 170 supporting the dolly along the outside and at the inside front corner. The wheels 170 may each have generally V-shaped peripheral grooves 172 so that the wheels may move on the generally V-shaped rails 174. The wheels 170 are freely rotatably mounted to brackets 176, which in turn are mounted by springs 178 to the dolly frame indicated generally at 180. The frame 180 may include end frame members 182 and side frame members 184, suitably connected together.

The inside rear corner of each dolly may be supported on a wheel 186, again having a peripheral V-groove, to ride on the V-shaped rails. The wheels 186 on the two dollies at each end of the machine are journaled on a common shaft 188, with the shaft 188 being driven from a motor 190, by means of a chain drive or the like, including a chain 192, a gear 194 on the drive shaft of the motor, and a second gear 196 fixed to shaft 188. The motor 190 is mounted on the underneath side of the bridge indicated generally at 24, with the bridge being fixed between each pair of dollies at the ends of the molding machine. A control box or the like 198 may be mounted on each bridge 24. The bridge 24 may include a rear frame member 200 mounted on top of side frame members 202 which are in turn bolted to the side frame members 184 forming a part of the dolly frame 180. Each drive motor 190 is effective to move its pair of dollies toward and away from the mold rotating apparatus and will move these dollies simultaneously.

Mounted on each frame 180 is an elevator frame 204 including side frame members 206 and end frame members 208. The end frame members 208 are fixed to uprights 210, there being one upright 210 at each corner of the frame 204. Each of the uprights 210 may be in the form of generally U-shaped angles, as illustrated particularly in FIGURE 5, and are slideable on uprights 212 fixed to the frame 180. Each of the uprights 212 mounts a rotatable gear 214 at its upper end and a driven gear 216 at its lower end. A suitable chain or the like 218 passes around the gears 214 and 216. Each of the chains 218 may be suitably fixed, by a pin or screw 220 to the uprights 210. Note particularly the bottom of FIGURE 6 in which the pin connection is shown.

An elevator motor 222 is mounted on the bottom of each dolly and has a drive shaft 224. A gear 226 is fixed directly on drive shaft 224 and is effective, through a chain or the like 228, and a large gear 230, to drive a shaft 232 journaled in supports 234 at the lower rear of the dolly. Gears 216 and gear 230 are all fixed on the shaft 232. Also fixed to the drive shaft 224 of each elevator motor 222 is a gear 236 in mesh with a second gear 238 fixed on a rotatable countershaft 240. A gear 242, similar to gear 226, is fixed on shaft 240 and is effective, through a suitable flexible drive member 244, for example a chain, to drive gear 246 which in turn is fixed on and drives shaft 248 journaled in supports 250 at the front end of the dolly. The gears 216 at one of the dolly are fixed to shaft 232, and at the other end are fixed to shaft 248. The gear arrangement described above is necessary so that the elevator frame 204 will be simultaneously raised and lowered at both ends. Note particularly FIGURE 9 which shows the raised position of the elevator. The elevator is effective to raise and lower the mold to position it within the rotating frame. The invention should not be limited to a motor driven elevator as hydraulically or pneumatically operated elevators are also satisfactory.

The elevator frame 204 at each end mounts a pair of generally upright brackets 252 each being formed by a pair of angles 254 spaced apart and connected together at their upper ends by a small plate 256. A pair of inner angles 258 are positioned within the angles 254 at the top of each bracket 252. Blocks or the like 260 may be positioned between pairs of angles 254 and 258 to hold them together, with the angles together defining an opening indicated at 262 to receive the end 118 of each mold spindle. The mold ends are positioned in the openings 262 and the mold is carried by the brackets 252 in such a manner that it may be raised up into the rotatable frame and locked.

Mounted to the bottom of the elevator frame 204 is a motor 264 having a drive shaft 266 mounting a gear 268 for driving a chain 270. The upper end of the chain passes around a gear 272 fixed to a shaft 274. The shaft 274 is journaled at each end in a bracket 276, with each of the brackets being fixed to one of the uprights 210. Rollers or the like 278 are fixed on the shaft 274 and the shaft and rollers are effective to rotate a mold positioned on the dolly. Note that the brackets 276 are adjustable on the uprights 210 to accommodate various size molds. A similar shaft may be mounted on the opposite side of the dolly and may rotatably mount idler rollers 280.

A pan 282 or the like is mounted on the elevator frame 204 directly beneath the mold. Positioned within the pan, preferably along the bottom, as illustrated in FIGURE 18, is a pipe or the like 284, having a plurality of generally upwardly directed openings or holes 286. A connection 288 supplies cooling fluid, which is preferably water, but which may be either a liquid or gas, to the pipe 284. A spray from the openings 286 is directed against the rotating mold to cool it. In addition to the pipe 284 which may lay along the bottom of the pan, there may be an upright pipe 290 at one end of the pan to spray water against the mold end. The pan may have a suitable connection to drain, not shown. The coolant may flow in a closed system, although this is not necessary. Other cooling arrangements may be satisfactory, for example the molds may rotate partly or completely submerged in a bath.

Each of the dollies is driven toward and away from the mold rotating apparatus and each dolly may include its own elevator and motor to drive the same, as well as its own drive for rotating a mold positioned on the dolly. In addition, each dolly includes a cooling system, whether it be of the type shown, or otherwise, so that each mold may be cooled after it has been removed from the mold rotating apparatus.

FIGURES 19 and 20 illustrate the electrical circuit for operating the various motors described above. In FIGURE 19, the AC supply lines are indicated at 292. Motors 36 and 64 which are the drive motors for rotating the frames and the molds within the frames, are connected in parallel with each other and in series between lines 292 with a pair of normally open push buttons, PB13 and PB14, there being one on each of the two control panels, and a pair of normally opened contacts MCR. The closure of either PB13 or PB14 or contacts MCR is effective to start the motors. Push buttons PB13 and PB14 are for manual operation and are normally used for short movements of the frame and mold.

Also connected between lines 292 is coil 294 of motor control relay MCR, whose contacts MCR were described above. Normally open contacts TR2 and MCR are ln series with coil 294, with normally open contacts MCR being effective to lock in the relay coil once contacts TR2 have closed. Limit switch or cam-operated switch 168 is in series with coil 294 and is effective to always stop the frame in a generally horizontal position, regardless of what position the frame is in when the timing relay times out.

Also connected between lines 292 is coil 298 of gas control relay GCR and coil 300 of interlock relay IR. The gas control relay is effective to control the flow of gas to the burners and the interlock relay prevents dolly travel while the frame is rotating. In series with these two relays between lines 292 are normally open contacts TR2. Coil 302 of time relay TR2 is connected between lines 292 and is effective to control the various normally open contacts TR2 which have been described above. Push buttons PB9 and PB10, there again being one on each of the control panels, are normally open and are effective, upon closure, to start rotation of the frame and mold and to start operation of the burner. When either one of these push buttons is closed, normally open contacts TR2 in parallel with the push buttons will be closed to lock in the coil of relay TR2. Also, in this same circuit are normally open contacts CR1 which prevent rotation of the frame during dolly travel. These contacts will be closed when the dolly is stationary and open when the dolly is traveling. Push buttons PB11 and PB12 are effective to manually stop the rotation of the frame and mold. Normally, time relay TR2 will time out to stop rotation.

Motors 106 for closing the frame locks on the molds are connected in circuit between lines 292 and are operated by push buttons PB15 and PB16. Switch 128 is used to indicate when locking is completed.

FIGURE 20 illustrates the control circuits for operating the motors on the dollies. The dolly travel control circuit includes dolly travel motors 190 connected between lines 292. Push button PB1 is depressed to start motors 190. Coil 306 of control relay CR1 will operate to close contacts CR1 to lock in the control relay. Push button 308 may be used to stop the forward travel of the dollies at any time. Normally closed contacts IR are operated by the interlock relay coil 300 illustrated in FIGURE 19. A microswitch 310 is effective to open at the end of the forward limit of the dolly travel to automatically stop the dollies at a predetermined position beneath the mold rotating apparatus. When PB1 is closed, motor reversing relay CR2, whose coil is indicated at 312, will be operated so that the dolly travel motor 190 will move the dolly in the forward direction. Push button PB3 is closed to start the rearward travel of the dolly and the closure of this push button is effective to open or release coil 312 of relay CR2 and so cause the dolly travel motors 190 to operate in the opposite direction. When push button PB3 is closed, time relay TR1, whose coil is indicated at 314, will be operated and contacts TR1 in series with it will be closed to operate the coolant solenoid valve 316. Whenever the dolly is moving in the rearward direction, coolant will be supplied to cool the mold positioned on the dolly. A microswitch 318 is utilized to stop rearward dolly travel. Time relay TR1 is effective to open the circuit to solenoid 316 after a predetermined time.

The dolly mold rotator circuit includes motors 264, which may be DC motors, and may be supplied through a rectifier 320. Push button PB4 is closed to manually start operation of motors 264 and control relay CR3 whose coil 322 is in parallel with the motors 264 will operate so that contacts CR3 in series therewith will be closed to lock in operation of the motors. Contacts CR1, controlled by coil 306 described above, are used to automatically rotate the mold whenever the dolly is moving. Push button PB5 may be used to stop rotation of the mold at any time.

The elevator circuit for raising and lowering the mold includes motors 232 connected in series with normally closed contacts CR9, normally closed contacts CR1. normally closed microswitch 324, normally closed push button 326, and normally open push button PB6. When PB6 is closed, coil 328 of control relay CR4 will be operated to lock in the operation of the elevator motors 232. At the same time, coil 330 of motor reversing relay CR5 will be operated to change the position of contacts CR5 such that the motor will be operated in a direction to raise the elevator and mold. Microswitch 324 will open when the mold has reached the limit of its upward travel and the mold is properly positioned in the mold rotating apparatus. Push button 326 may be used to stop the operation of motors 232 at any time. When it is desired to lower a mold, or to lower an elevator without a mold, push button PB8 is operated to open the circuit to coil 330 of motor reversing relay CR5 to run the motor in a direction to lower the elevator. At the same time, coil 332 of control relay CR9 will be operated to supply current to motors 232. Microswitch 334 will open at the lower limit of the elevator travel. Normally closed contacts CR1 insure that the elevator never operates when a dolly is moving.

The use, operation and function of the invention are as follows:

In operation, the molds on one pair of dollies that are tied together are charged with a satisfactory amount of material. Thermoplastic and thermosetting resins are satisfactory, as are other materials. These dollies are then moved underneath the mold rotating apparatus and the elevators of each dolly are simultaneously operated to raise the molds in position to be fixed in the mold rotating apparatus. The locks on the mold rotating apparatus are operated to secure each of the molds. The dollies are then backed away and the mold rotating apparatus rotates the mold simultaneously in two planes through multiple orbits. During rotation, the molds are heated. The speed of rotation of both the frames and the mold may vary. Preferably, the frames are always parallel so that both may be loaded and unloaded together.

After the molds have been rotated a suitable period of time, either determined by the operator or by a time controlled relay, the molds will stop. Of importance is the fact that the molds will always end up in a horizontal position, regardless of when the control relay times out or an operator pushes the manual stop button. The mold rotating motors will continues until a switch on the frame apparatus is opened, indicated that the frames are horizontal. When the frames have stopped, the same pair of dollies will move underneath the frames and the elevators will raise up and receive the molds as they are released from the frames. The elevators will drop the molds down to the normal position and as the dollies move away from the frames, the molds will be simultaneously rotated on the dollies and cooled. A preferred form of cooling is to spray cold water on the mold, although the invention should not be so limited as cooling in a bath is also satisfactory.

At the same time as one pair of dollies are removing molds which have just been rotated and heated, the second pair of dollies which have been charged during the previous rotating interval, are moving in position in the frames and the rotating and heating cycle begins again.

As can be seen, each pair of dollies moves in and either picks up and delivers molds and then moves out. When one pair of molds is rotating, the other pair of molds is being stripped of completed articles and charged with new material. Such an arrangement makes maximum use of the rotating and heating apparatus.

It is also practical to operate each dolly individually. The sequence of operation will be different from that described above as the dollies are not operated in pairs. Suitable drive arrangements may be provided for rotating the frames and for coordinating operation of the dolly motors.

The apparatus shown is illustrative of one satisfactory predominantly infrared gas-fired heating arrangement. The heat can be applied generally uniformly throughout the length of the mold or the heat at particular locations along the mold can vary. The heating element itself, which travels with the frame, can be contoured to accept certain types of molds. The heating element may completely enclose the mold and rotate with it. Such an enclosing heater could also be stationary relative to the mold. The molds may be painted different colors to locally control thickness of the finished product. The heating period or heating cycle may vary depending upon the material thickness, size and type of article.

The type and size of mold, and the number of molds positioned in a single frame, may vary. The present invention is particularly satisfactory for making large containers.

Although the invention has been described in connection with vehicles that run on tracks beneath rotating frames, other means may be satisfactory for moving the molds into and out of the rotating frames in the general manner described. The tracks may be along the ceiling and the molds may be slung down from moving vehicles or dollies. Cranes may be used to move the molds in and out, although vehicles are preferred. It is not necessary to have the dollies move in and out toward the rotating frames, as in some applications a closed track in which the dollies can continuously move around may be satisfactory.

The various drives have been described as including a chain or other flexible drive member. Any one or all of the drives could instead comprise a direct drive gear motor with variable speed.

Cam-operated switches or microswitches have been described. Any type of disengaging mechanism, for example solenoid-operated, air-operated, or hydraulically-operated, is also satisfactory.

The particular apparatus shown for elevating the molds, and for rotating the molds on the dollies, can be widely varied without departing from the scope of the invention. In like manner, the means for moving the dollies and the common bridge connection between correspondig pairs of dollies may be varied.

We claim:
1. A method of thermofusion molding an article from a plastic resin material comprising,
   (a) charging a mold with a predetermined amount of said material,
   (b) continuously rotating said mold uniaxially about a first axis in a dolly,
   (c) transferring said mold, while continuously rotating as in (b) from said dolly into a rotatable frame, indexed in a sationary mold-loading position,
   (d) continuously rotating said mold about said first axis and simultaneously rotating said frame about a second axis perpendicular to said first axis,
   (e) continuously exposing said mold in (d) to a high-intensity predominantly infrared radiant energy source in the temperature range of from about 1200° F. to 3000° F., said heat source being fixedly disposed relative to said frame,
   (f) transferring said mold, while continuously rotating as in (b), from said frame into said dolly, indexed in a stationary mold-unloading position,
   (g) cooling said mold while continuously rotating uniaxially in said dolly, and
   (h) removing said article from said mold.

References Cited

UNITED STATES PATENTS

| | | | |
|---|---|---|---|
| Re. 25,587 | 6/1964 | Wiltshire. | |
| 1,328,887 | 1/1920 | Nitzgen. | |
| 1,703,024 | 2/1929 | Williams. | |
| 1,784,686 | 11/1930 | Fauerbach | 264—310 |
| 3,009,209 | 11/1961 | Weinbrenner | 264—310 |
| 3,044,124 | 7/1962 | Valentine | 264—311 |
| 3,115,680 | 12/1963 | Soderquist. | |
| 3,164,654 | 1/1965 | Spencer | 264—311 |
| 3,233,287 | 2/1966 | Blue. | |
| 3,280,232 | 10/1966 | Lander. | |

ROBERT F. WHITE, Primary Examiner

A. SOKAL, Assistant Examiner